United States Patent
Miesterfeld

[19]

[11] Patent Number: 6,141,710
[45] Date of Patent: Oct. 31, 2000

[54] INTERFACING VEHICLE DATA BUS TO INTELLIGENT TRANSPORTATION SYSTEM (ITS) DATA BUS VIA A GATEWAY MODULE

[75] Inventor: Frederick O. Miesterfeld, Troy, Mich.

[73] Assignee: DaimlerChrysler Corporation, Auburn Hills, Mich.

[21] Appl. No.: 09/211,450

[22] Filed: Dec. 15, 1998

[51] Int. Cl.[7] .............................. G06F 13/16; G06F 13/38; G06F 13/42; G11C 7/00

[52] U.S. Cl. ...................... 710/100; 710/128; 711/147; 701/1

[58] Field of Search ...................... 710/100, 128, 710/129, 1, 107, 105, 52, 126, 240; 711/100, 147; 701/1, 33, 35, 36, 51, 53, 54; 709/213; 365/189.01

[56] References Cited

U.S. PATENT DOCUMENTS

| | | |
|---|---|---|
| 4,041,472 | 8/1977 | Shah et al. . |
| 4,205,373 | 5/1980 | Shah et al. . |
| 4,634,110 | 1/1987 | Julich et al. . |
| 4,967,398 | 10/1990 | Jamoua et al. . |
| 5,265,218 | 11/1993 | Testa et al. . |
| 5,410,654 | 4/1995 | Foster et al. . |
| 5,577,230 | 11/1996 | Argade et al. . |
| 5,664,117 | 9/1997 | Shah et al. . |
| 5,664,152 | 9/1997 | Ezzet . |
| 5,671,371 | 9/1997 | Kondo et al. . |
| 5,701,417 | 12/1997 | Lewis et al. . |
| 5,721,839 | 2/1998 | Callison et al. . |
| 5,734,847 | 3/1998 | Garbus et al. . |
| 5,740,394 | 4/1998 | Minemura et al. . |
| 5,761,516 | 6/1998 | Rostoker et al. . |

*Primary Examiner*—Gopal C. Ray
*Attorney, Agent, or Firm*—Roland A. Fuller, III

[57] ABSTRACT

A data exchange gateway for enabling the exchange of data between a vehicle data bus (VDB) and an intelligent transportation system (ITS) data bus. The gateway includes a memory accessible by both a VDB interface and an ITS data bus interface so that data and commands may be shared between each respective bus through the shared memory.

15 Claims, 7 Drawing Sheets

INTERFACING VEHICLE DATA BUS TO INTELLIGENT TRANSPORTATION SYSTEM (ITS) DATA BUS VIA A GATEWAY MODULE

FIELD OF THE INVENTION

This invention relates generally to a gateway for interfacing a vehicle data bus to an intelligent transportation system data bus, and more particularly, a gateway including a memory which the vehicle data bus and the intelligent transportation system data bus may each access in order to exchange data between the respective buses.

DESCRIPTION OF THE RELATED ART

Automotive and other vehicle systems are increasingly being controlled by electronic control modules. The electronic control modules receive inputs which provide data and other information to the module. The module processes the inputs and generates electrical control signals as outputs to effect some type of vehicle control. For example, an electronic engine control module receives several inputs, including air flow, fuel flow, vehicle speed, ambient temperature, and others, and processes these inputs to generate output control signals to effect a vehicle operation, such as fuel injector or ignition timing signals. Other vehicle systems maybe similarly controlled, such as transmission, instrumentation, vehicle impact systems, and the like. With the proliferation of electronic control systems, vehicle designers seek to facilitate data exchange within each respective control system and, optionally, between respective control systems. One approach to facilitating data exchange is the use of vehicle data buses to facilitate such data exchange.

In addition to the above-discussed vehicle systems, third party manufacturers design devices which require vehicle data as input in order to operate the device or implement some additional feature on the vehicle. For example, third party manufacturers may provide navigation systems, diagnostic systems, internet interface systems, personal computer interface systems, and the like for receiving data. In some applications, these systems may also seek to control vehicle functions where appropriate and safe.

Third party systems introduce many issues which must be considered in order to design a suitable system. First, because it is impractical for each third party system to install sensors to provide the information required by that particular system, particularly because the data may already be written on a vehicle data bus, a data exchange system should be implemented which enables the third party device to obtain data from the vehicle data bus. Second, although it may be desirable to share data, safety and other considerations necessitate that the third party has limited access to the vehicle data bus so as to not interfere with operation of the vehicle. Third, any command requested by the third party device should be arbitrated by the vehicle data bus in order to prevent the third party device from interfering with operation of the vehicle. Fourth, considering the many vehicle models and the consequently varied vehicle systems, it is impractical to expect the third party manufacturer to provide a device which interfaces with each vehicle sold on the market using vehicle specific protocol, so that compatibility of a third party device with any given vehicle must be considered.

Thus, it is an object of the present invention to provide a gateway for enabling data exchange between vehicle systems and third party systems which may require such data.

It is a further object of the present invention to provide a data exchange gateway to enable a third party device to implement selected commands on a vehicle system.

It is yet a further object of the present invention to provide a data exchange gateway for enabling data exchange between a vehicle data bus and an intelligent vehicle transportation system data bus.

It is yet a further object of the present invention to provide a gateway including a common memory having addresses where each address is predetermined to store specific vehicle data information to commonize a data exchange protocol for various third party devices.

It is yet a further object of the present invention to provide a gateway including a common memory between the vehicle data bus and the intelligent transportation system data bus in which predetermined memory addresses may be used to store specific commands which a third party device may request of a specific vehicle controller.

It is yet a further object of the present invention to provide a firewall between a vehicle data bus and an intelligent transportation system data bus in order to maintain security of the vehicle data bus.

SUMMARY

This invention is directed to a data sharing system in a vehicle. The data sharing system includes a vehicle system controller operable to process vehicle data to control at least one vehicle related function, where the vehicle system controller has at least intermittent and direct access to and exchanges data on a vehicle data bus. An ancillary system controller controls an operation other than the one vehicle related function, and the ancillary system controller is restricted from the vehicle data bus and, therefore, is dependent upon data exchange with the vehicle system controller for input data and on the vehicle system controller to implement a selected control operation. A memory is accessible by the vehicle system controller and the ancillary system controller. A vehicle data bus interface exchanges data between the vehicle system controller and the memory, and an ancillary data bus interface exchanges data between the vehicle system controller and the memory. Further, the vehicle data bus interface restricts access of the ancillary system controller to the vehicle data bus.

Additional objects, features, and advantages of the present invention will become apparent in the following description and the appended claims taken in connection with the accompanying drawings.

DETAILED DESCRIPTION OF THE INVENTION

Figure 1:
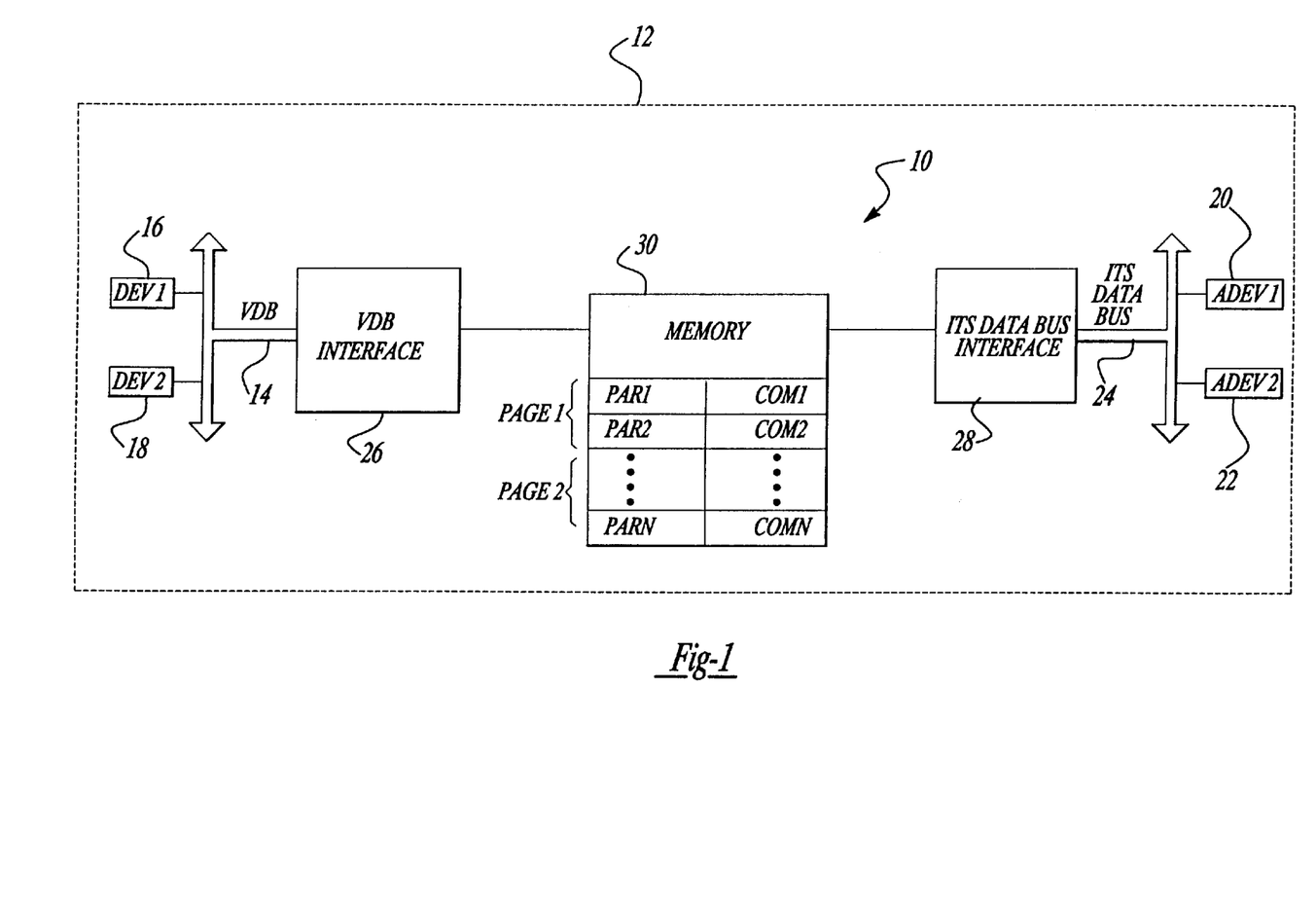
FIG. 1 is a block diagram of the gateway system arranged in accordance with a first embodiment of the present invention.

FIG. 1 depicts an intelligent transportation system (ITS) gateway 10 implemented on a vehicle 12 arranged with the principals of the present invention. A typical vehicle 12, as shown, includes a vehicle data bus (VDB) 14. VDB 14 provides a mechanism for data exchange between one or plurality of devices 16, 18, one or both of which write data to or read data from VDB 14. VDB 14, and devices, 16, 18 are typically assembled as part of the vehicle and sold with the vehicle and control vehicle operations such as engine operation, transmission operation, instrumentation operation, and the like. In addition to devices 16, 18, which are inherently included with the vehicle, third party manufacturer may desire to provide devices which require data from devices 16, 18 or, optionally, may desire to have devices 16, 18 implement predetermined commands. Devices 20, 22, referred to as ancillary devices, represent such add-on devices as were described in the background herein. Data exchange may occur between devices 20, 22 through ITS data bus 24.

With respect to the present invention, it is desirable to provide a data exchange system between VDB 14 and ITS data bus 24. To effect such an exchange, a vehicle data bus (VDB) interface 26 reads and writes data from VDB 14. VDB interface 26 enables the exchange of data between memory 30 and VDB 14. Similarly, ITS data bus interface 28 enables data exchange between memory 30 and ITS data bus 24.

Preferably, memory 30 is allocated in a predetermined fashion so that predetermined vehicle perameters occupy predetermined memory locations, referred to as mailboxes. Each peramiter can be assigned a mailbox, shown as PAR1 and PAR2, ..., PARN. Similarly, predetermined sections of the memory can be allocated as a mailbox for storing predetermined commands in predetermined memory locations, shown as COM1, COM2, through COMN. In this manner, each parameter and command may be assigned to a certain mailbox, and only the specified data or command may be placed in that mailbox. Further, the mailboxes can be grouped into pages, Page 1, Page 2 for subject specific data, such as manufacturer specific data, engine related data, transmission related data, and the like. Similar pagination may be implemented for arranging command mailboxes into pages. Memory 30 is accessible to both VDB interface 26 and ITS data bus interface 28 so that each interface will be able read from and/or write to memory 30. One skilled in the art will recognize that memory 30 may receive data from VDB interface 26 or ITS data bus interface 28 in either a parallel or a serial fashion, depending on the particular design considerations. One implementation of a serial data exchange which will become apparent with respect to FIGS. 2 and 3.

Figure 2:
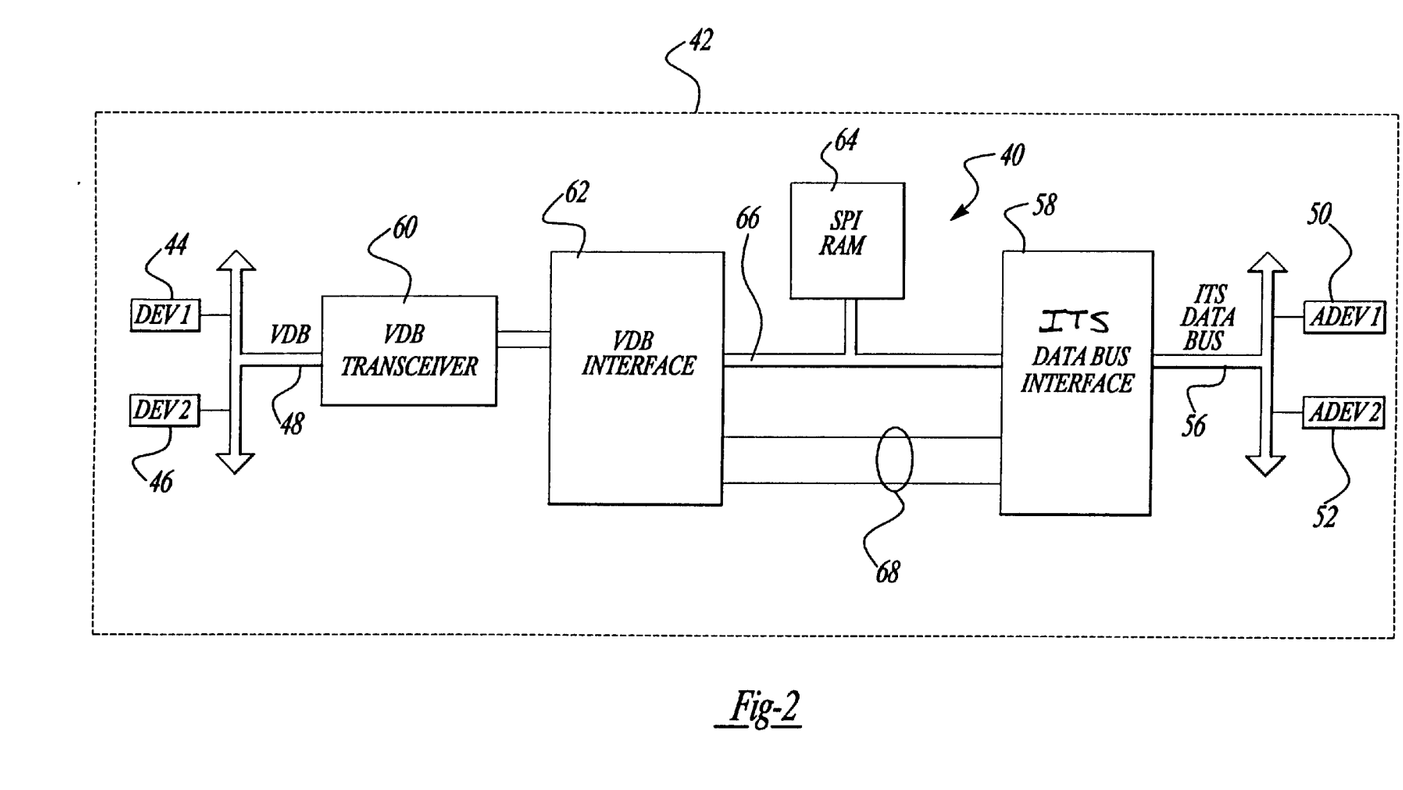
FIG. 2 is block diagram of a gateway system arranged in accordance with a second embodiment of the present invention.

FIG. 2 depicts a second embodiment of the ITS gateway 40 implemented on a vehicle 42. Similarly, as described with respect to FIG. 1, vehicle 42 includes vehicle control devices 44, 46. Data exchange occurs between devices 46, 48 via vehicle data bus (VDB) 48. Also as described with respect to FIG. 1, vehicle 42 may include one or more ancillary control devices 50, 52. Ancillary control devices 50, 52 exchange data via an intelligent transportation system (ITS) data bus 56.

Data exchange between VDB 48 and ancillary or ITS data bus 56 occurs through the gateway 40 comprising vehicle data bus (VDB) transceiver 60, vehicle data bus (VDB) interface 62, and memory or serial peripheral interface random access memory (SPI RAM) 64, and ITS data bus interface 58. SPI RAM 64 is preferably arranged as described above with respect to memory 30. SPI bus 66 interconnects VDB interface 62 and ITS data bus interface 58 with SPI RAM 64. A plurality of handshake lines 68 interconnect VDB interface 62 and ITS data bus interface 58 so that handshake signals may be exchanged therebetween to coordinate access to SPI RAM 64. VDB transceiver 60 provides an interface between VDB 48 and VDB interface 62. VDB transceiver 60 thus exchanges data between VDB 48 and VDB interface 62. Preferably, VDB 48, VDB transceiver 60, and VDB interface 62 are configured to implement the J1850 configuration as prescribed by the Society of Automotive Engineers (SAE) or any other industry standard as may be required.

In operation, VDB interface 62 controls data flow between VDB 48 and SPI RAM 64. In particular, VDB interface 62 examines data on VDB 48 to determine if it is pertinent to ITS data bus 56 and to determine the appropriate location in SPI RAM 64 to write the data. In such instances, VDB interface 62 writes its data to a selected, specific memory location, such as to memory locations PAR1, PAR2, PARN, as described in FIG. 1. Further, VDB interface 62 obtains commands from memory locations COM1, COM2, ..., COMN in SPI RAM 64 and determines whether the command is appropriately formed for transmission on VDB 48. VDB interface 62 also coordinates read/write functions with ITS data bus interface 58 through a handshake procedure in order to avoid collisions between read/write activities of the respective vehicle data bus interface 62 and ITS data bus interface 58. VDB interface 62 is also responsible for insuring security of the data placed on VDB 48 by insuring that only appropriate data is written to SPI RAM 64. VDB interface 62 also insures security of VDB 48 by inspecting commands prior to placing any the command on VDB 48.

Preferably, SPI RAM 64 includes at least 256 bytes of memory which are allocated into slots that are reserved for specific bytes of data. Specific memory locations are preferably allocated for data/commands received from VDB 48 to be used by ITS data bus 56 and for data/commands received from ITS data bus 56 to be transmitted to VDB 48. Data is preferably loaded into SPI RAM 64 serially by first serially loading an address in which the data will be placed and then loading the data into SPI RAM 64. SPI RAM 64 also preferably includes an enable pin to enable more than one RAM chip to be placed on SPI bus 66.

Figure 3A:
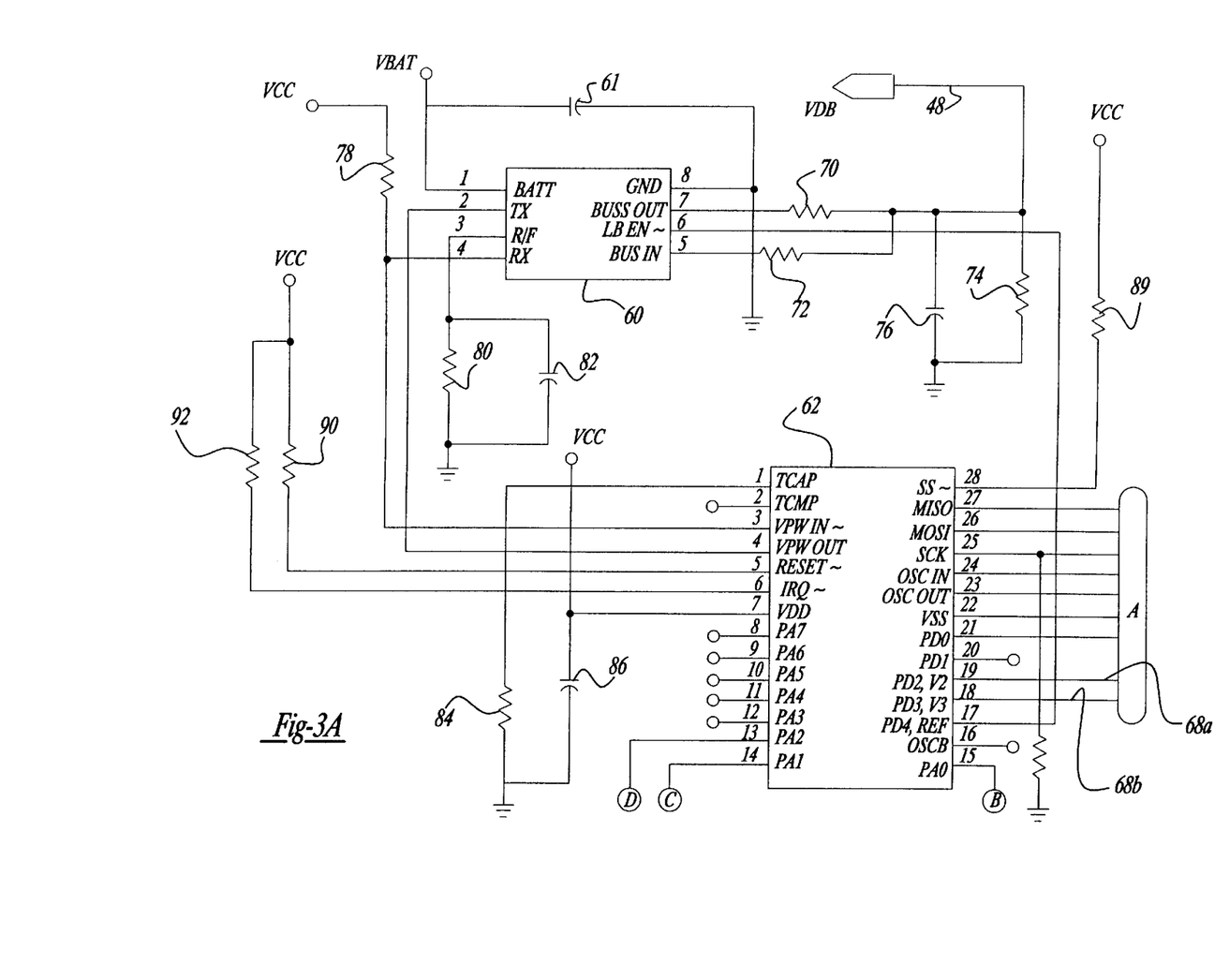
FIGS. 3A, 3B, and 3C is a circuit diagram of the gateway system of FIG. 2.
Figure 3B:
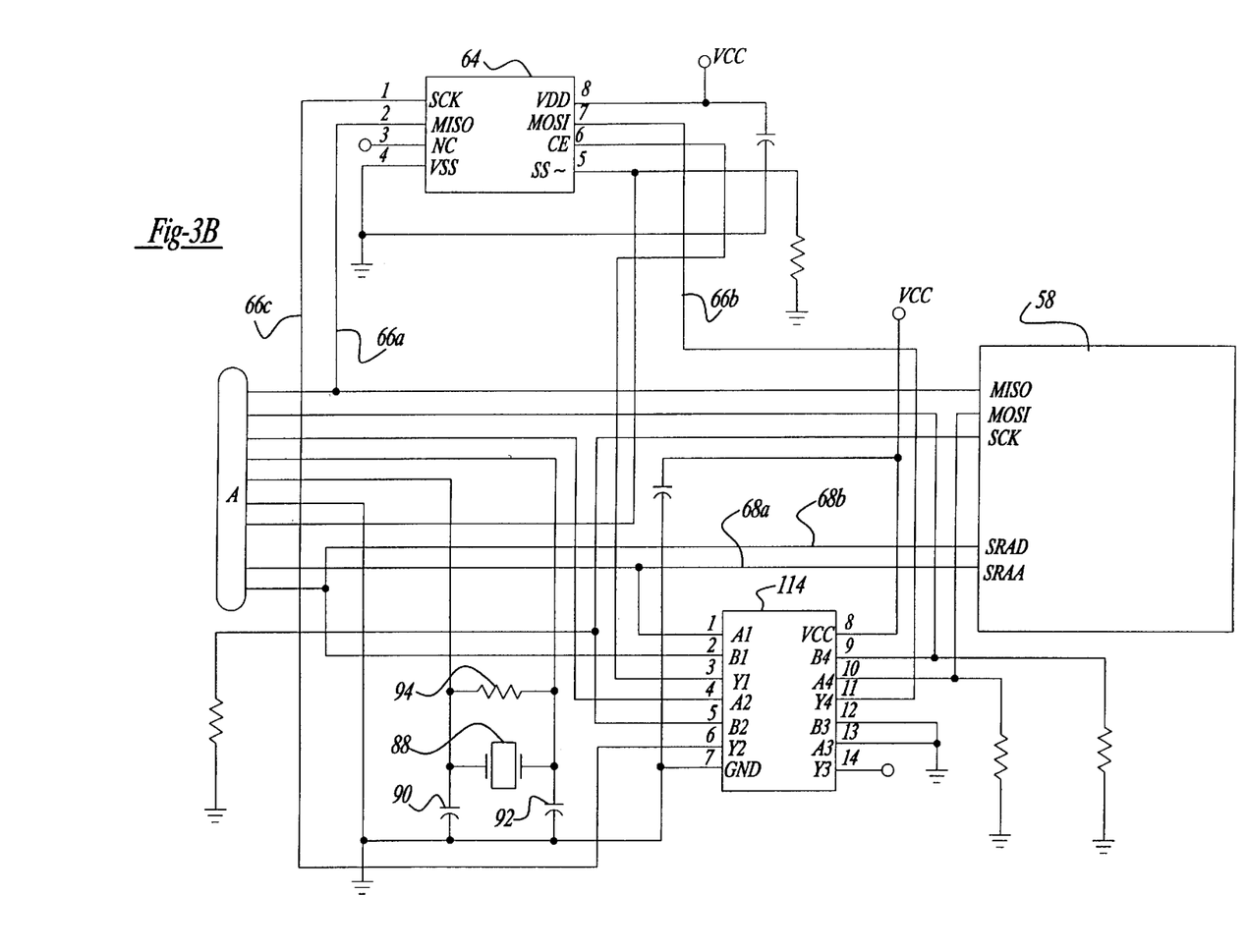
Figure 3C:
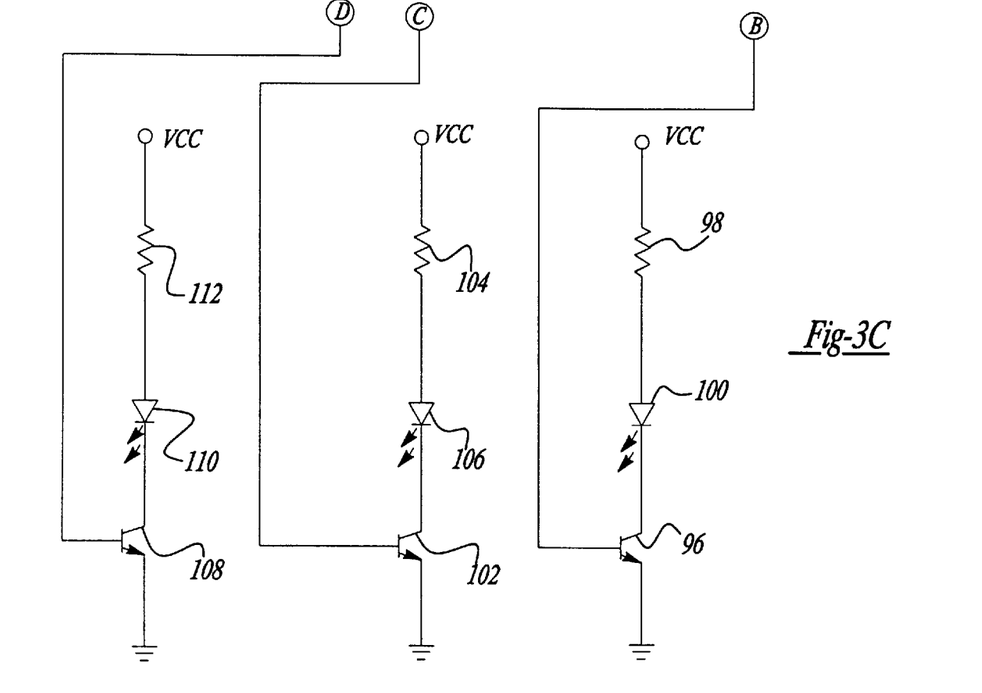

With reference to FIGS. 3A, 3B, and 3C, a circuit diagram of the circuit implementing the block diagram of FIG. 2 is shown. Reference numerals depicting the particular functional blocks from FIG. 2 shall be used to refer to the analogous circuit element in FIGS. 3A, 3B, and 3C. VDB transceiver 60 communicates with VDB 48 and is implemented as an integrated circuit such as Harris Semiconductor HIP7020 integrated circuit. As shown, battery power VBAT is applied to pin 1 VBAT, and pin 8 GND is tied to ground to provide operating power for VDB transceiver 60. A capacitor 61 provides noise suppression of the VBAT signal. Data is written to and read from VDB 48 using a pair of pins, pin 7 BUS OUT and pin 5 BUS IN. The pins are interconnected in parallel through a pair of resistors 70, 72. VDB 48 connects to pins 5 and 7 of VDB transceiver 60 and also connects to ground through resistor 74 and capacitor 76. VDB transceiver 60 communicates with VDB interface 62 through transmit pin 2 TX and receive pin 4 RX. Pin 4 RX is connected to voltage VCC through resistor 78. Pin 3 R/F of VDB transceiver 60 is connected to a resistor-capacitor (RC) circuit including resistor 80 and capacitor 82. The RC circuit defines the rise and fall times of the signal output to VDB 48. Pin 6 LB EN~ of VDB transceiver 60 is connected to pin 17 REF of VDB interface 62 and enables loop-back testing of VDB transceiver 60.

VDB interface 62 is a 28 pin integrated circuit which is preferably a Harris Semiconductor HIP7030A2 surface mount package. VDB interface 62 is powered by application of a voltage VCC to pin 7 VDD and is grounded through pin 22 VSS. A capacitor 86 connects pin VDD to ground to effect noise suppression. Data exchange between VDB interface 62 and VDB transceiver 60 occurs through variable pulse width in pin 3 VPW IN~, which is connected to pin RX of VDB transceiver 60, and variable pulse width OUT pin 4 VPW OUT, which is connected to pin TX of VDB transceiver 60. Pins 5 RESET~ and 6 IRQ~ of VDB interface 62 are connected to VCC through a pair of resistors 90 and 92, respectively, to prevent an occurrence of reset or interrupt signal being applied to VDB interface 62. Pins 24 OSCIN and 23 OSCOUT cooperate with. The clock signal is received from an oscillator circuit comprising a oscillator 88, such as a 10 megahertz oscillator, a pair of capacitors 90, 92, and a resistor 94 to form a clock signal to drive VDB interface 62.

VDB interface 62 communicates with SPI RAM 64 through a pair of data lines 66a, 66b, and a serial clock line 66c to define SPI bus 66. Line 66a is a master-in-slave-out MISO data line, and data line 66b is a master-out-slave-in (MOSI) data line. Specifically, MOSI line 66b enables a master device to output data to the slaved SPI RAM 64. Similarly, MISO line 66a enables a master device to read data from the slaved SPI RAM 64. VDB interface 62 and ITS data bus interface 58 function as master devices with respect to slaved device SPI RAM 64. Pin 28 SS~ of VDB interface 62 is connected to VCC through resistor 89 to maintain VDB interface 62 in master mode.

In order to prevent collisions when accessing SPI RAM 64, a pair of handshake lines 68a, 68b carry signals to arbitrate access to SPI RAM 64. Handshake line 68a or SPI RAM Access Acquired (SRAA) is set high when a master device is accessing SPI RAM 64. This signal also functions as a input to chip enable pin 6 CE of SPI RAM 64. Handshake line 68b or SPI RAM Access Denied (SRAD) receives an output signal from VDB interface 62 when VDB interface 62 is accessing SPI RAM 64. In operation, SRAA is set high if ITS data bus interface 58 is accessing SPI RAM 64, and SRAD is set high if VDB interface 62 is accessing SPI RAM 64, as will be described further herein.

VDB interface 62 generates output signals for actuating indicator lights in accordance with the current operating condition of SPI RAM 64. For example, pin 15 PAO of VDB interface 62 outputs a signal which is high when SPI RAM 64 is busy. When high, PAO outputs a signal which activates transistor 96 of FIG. 3C. Activation of transistor 96 creates a current path to ground from VCC through resistor 98, LED 100, and transistor 96. This activates LED 100 so that LED 100 is activated when SPI RAM 64 is busy. Similarly, pin 14 PA1 of VDB interface 62 outputs a signal which activates transistor 102 to create a current path from VCC to ground through resistor 104, LED 106, and transistor 102. This activates LED 106, which is preferably a color different than the color of LED 100. Pin PA1 outputs a high signal when VDB interface 62 is unable to transmit on VDB 48, such as when VDB 48 is shorted to ground when VDB interface 62 is attempting to transmit on VDB 48. Similarly yet, pin 13 PA2 outputs a signal to transistor 108 which activates transistor 108 to create a current path to ground from VCC through resistor 110, LED 112, and transistor 108. This activates LED 112, which is preferably a color other than that used for LED's 100 and 106. PA2 is set high whenever the SRM line is continuously asserted high for more than one second.

Because either VDB interface 62 or ITS data bus interface 58 may act as masters to the slaved SPI RAM 64, VDB interface 62 and ITS data bus interface 68 share the SCK, MISO, and MOSI inputs to SPI RAM 64. To facilitate interconnection between the output pins of the respective vehicle data bus interface 62 and ITS data bus interface 58 to the signal lines input to SPI RAM 64, gate logic 114 provides OR gates so that the output pins MISO, MOSI, and SCK of the respective interfaces are gated through gate logic 114 prior to input to SPI RAM 64. For example, output pin 26 MOSI of VDB interface 62 is input to pin 9 B4 of gate logic 114, and MOSI output from ITS data bus interface 58 is input to pin 10 A4 of gate logic 114. The input to pins A4 and B4 are essentially input to an OR gate whose output appears at pin 11 Y4 of gate logic 114 and is output to the pin 7 MOSI of SPI RAM 64. Similar arrangements are provided for the SRAA and SCK signals. Specifically, pins 1 and 2, A1, B1 of gate logic 114 receive the SRAA and SRAD signals output by the respective ITS data bus interface 58 and VDB interface 62. These signals are inputs to an OR gate whose output appears on pin 4 Y1 and is applied to chip enable pin 6 CE of SPI RAM 64. Similarly, the SCK signals output by the respective interfaces are input to pins 4 and 5, A2, B2 of gate logic 114, and output pin 6 Y2 of gate logic 114 is input to pin 1 SCK of SPI RAM 64.

Figure 4:
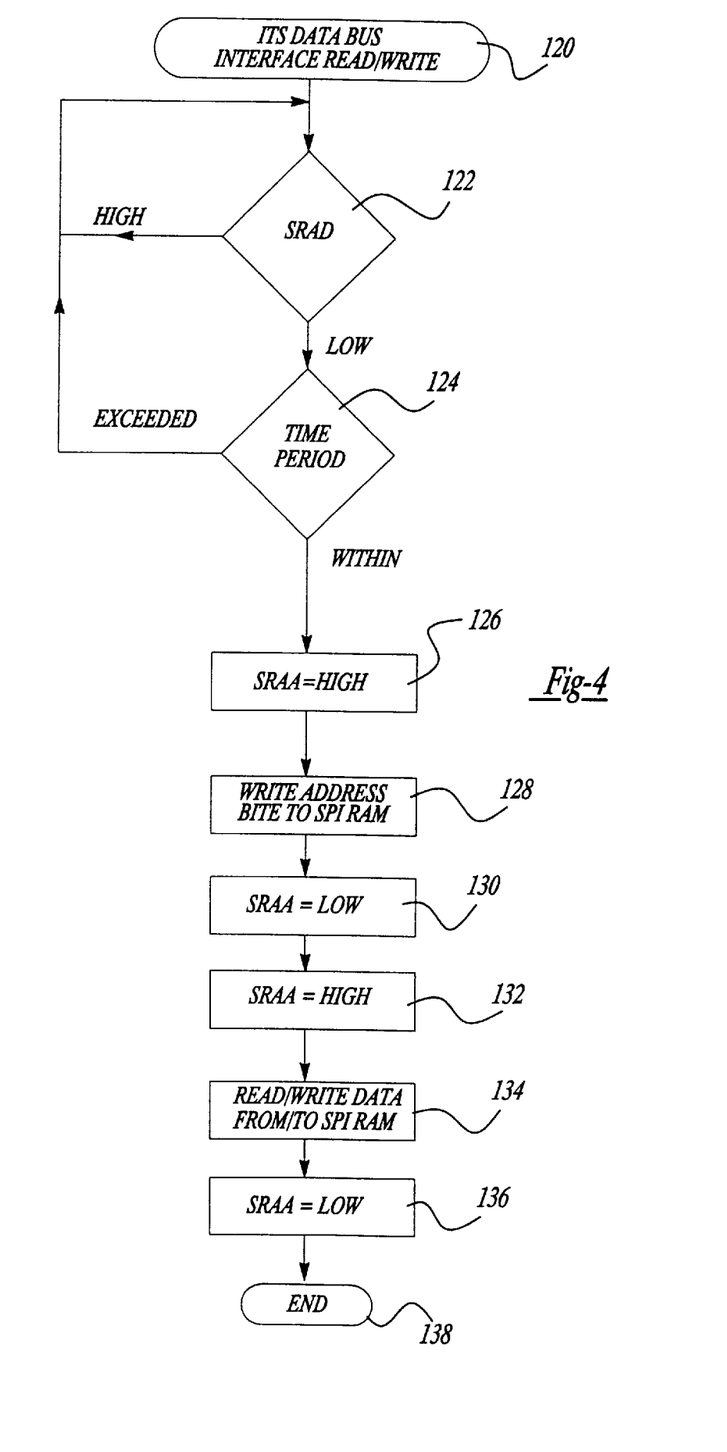
FIG. 4 is a flow diagram of the procedure for reading/writing data to the serial peripheral interface memory.

In operation, any of a number of devices, such as ITS data bus interface 58, may function as a host for SPI bus 66. When a SPI host exits a reset condition, such as power on, the SRAA output signal line of that host must be set low. The same is true for the SRAD line when VDB interface 62 exits a reset condition. FIG. 4 depicts a block diagram of the sequence for ITS data bus interface 62 reading/writing from/to SPI RAM 64. Control begins at block 120. When ITS data bus interface 58 attempts to access SPI RAM 64 such as for reading or writing ITS data bus interface 58 must first test the SRAD signal line as shown at block 122. If SRAD is high, the VDB interface 62 is accessing SPI RAM 64, and ITS data bus interface 58 must wait until SPI RAM 64 is available, and control returns to block 122. If SRAD is low, SPI RAM 64 is available. When ITS data bus interface 58 determines that SPI RAM 64 is available, ITS data bus interface 58 sets the SRAA signal line high, as shown at block 126. As shown at block 124, in a preferred embodiment, setting SRAA high must occur within 5 microseconds after determining that the SRAD signal line is low. If ITS data bus interface 58 is unable to set the SRAA signal line high within 5 microseconds after determining that SRAD is low, ITS data bus interface 58 must retest the SRAD input again before attempting to access SPI RAM 64, and control returns to block 122.

After SRAA is set high, as shown by block 126, ITS data bus interface 58 must then cause a single byte transfer of an address, including a setting of an appropriate page bit, as shown at block 128. ITS data bus interface 58 must then set the SRAA line low, as shown at block 130, to deselect SPI RAM 64. ITS data bus interface 58 once again set the SRAA output signal high, as shown at block 132, to select SPI RAM 64 so that ITS data bus interface 58 can read/write data to the desired address, as shown at block 134. Preferably, the time period between selecting the desired memory page and reading/writing data to SPI RAM 64 (between steps 130 and 132) is less than 5 microseconds. Following the read/write operation, control proceed to block 136 where ITS data bus interface 58 sets SRAA low. Control ends at block 138.

Whenever ITS data bus interface 58 is not accessing SPI RAM 64, it must set the SRAA signal line low. Further, ITS data bus interface 58 may test the SRAD signal line as frequently as desired and preferably shall not set the SRAA output line continuously high for more than 1 millisecond. After ITS data bus interface 58 has finished accessing SPI RAM 64, it must release control of SPI RAM 64 by setting the SRAA output signal low. Preferably, the ITS data bus interface 58 must wait 100 microseconds before once again setting the SRAA output signal high.

With respect to VDB interface 62, VDB interface 62 uses a similar protocol for reading/writing dated to SPI RAM 64 as described with respect to FIG. 4, but includes minor modifications as described herein. In particular, VDB interface 62 inspects SRAA at block 122, rather than SRAD. Further, with respect to blocks 126, 130, 132, and 136, VDB interface utilizes the SRAD signal rather than the SRAA signal.

In another mode of operation, VDB interface 62 processes command requests written to SPI RAM 64 by ITS data bus interface 58 for transmission onto VDB 48. VDB interface 62 allows only specific messages to be transmitted from ITS data bus interface 58 onto VDB 48 through SPI RAM 64. Further, VDB interface 62 shall maintain all aspects of VDB protocol when transmitting a message initiated by ITS data bus interface 58. That is, VDB interface 62 shall only transmit when VDB 48 has been determined as idle and shall obey all rules of arbitration as set forth within the SAE J1850 specification.

Figure 5:
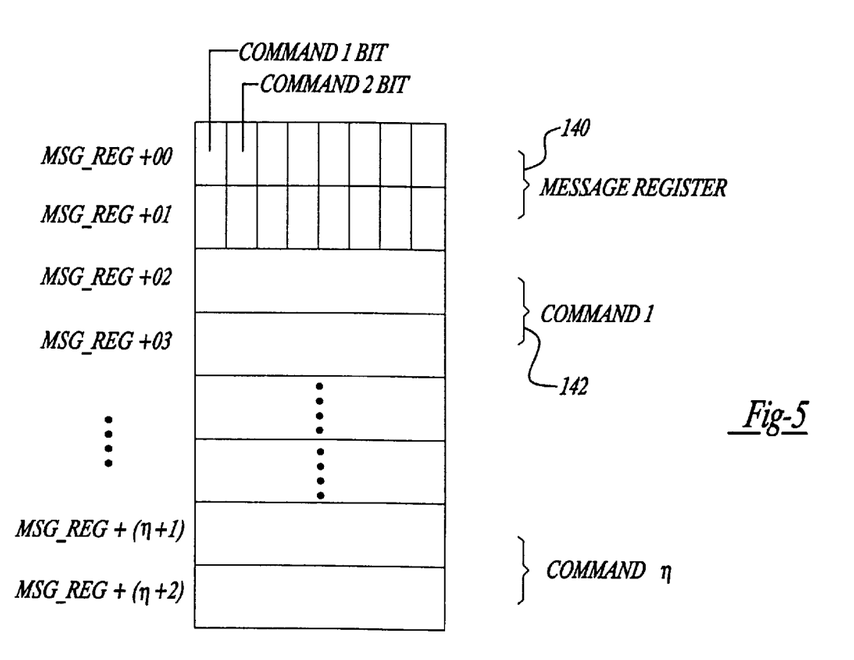
FIG. 5 is a block diagram of an exemplary arrangement of memory for storing commands for transmission on the vehicle data bus.

When ITS data bus interface 58 issues a command, it must first write the command word or words to SPI RAM 64 using the procedure as described above with respect to FIG. 4. In particular, ITS data bus interface 58 must write the command word or words to the appropriate memory page where a message register resides within SPI RAM 64. As shown in FIG. 5, the message register is bit mapped so that each bit corresponds to a specific command request. The message register 140 resides at address MSG_REG and comprises two bytes stored at addresses MSG_REG+00 and MSG_REG+01. In this particular embodiment, each byte consists of 8 bits so that the message register comprises a 16 bit word. Each bit of message register 140 corresponds to a particular command. For example, the most significant bit of message register 140, command 1 bit, corresponds to a pair of bytes stored at addresses MSR_REG+02 and MSG_REG+03, referred to as Command 1 142. Consecutive pairs of memory bytes are similarly combined for Command 2, Command 3, . . . , Command N. If one or more commands are to be issued, the corresponding bits must be set and written to the message register 140.

The pair of bytes that comprise a command include a command code stored in the first byte of the command an action code stored in the second byte of the command. ITS data bus interface 58 must also write the command code and the action code into the appropriate, predetermined addresses of SPI RAM 64 in addition to setting the appropriate bit of message register 140. The write operation occurs as described with respect to FIG. 4. Preferably, ITS interface data bus 58 does not clear any bits within message register 140 when it writes to the register and VDB interface 62 does not set any bits in message register 140.

Figure 6:
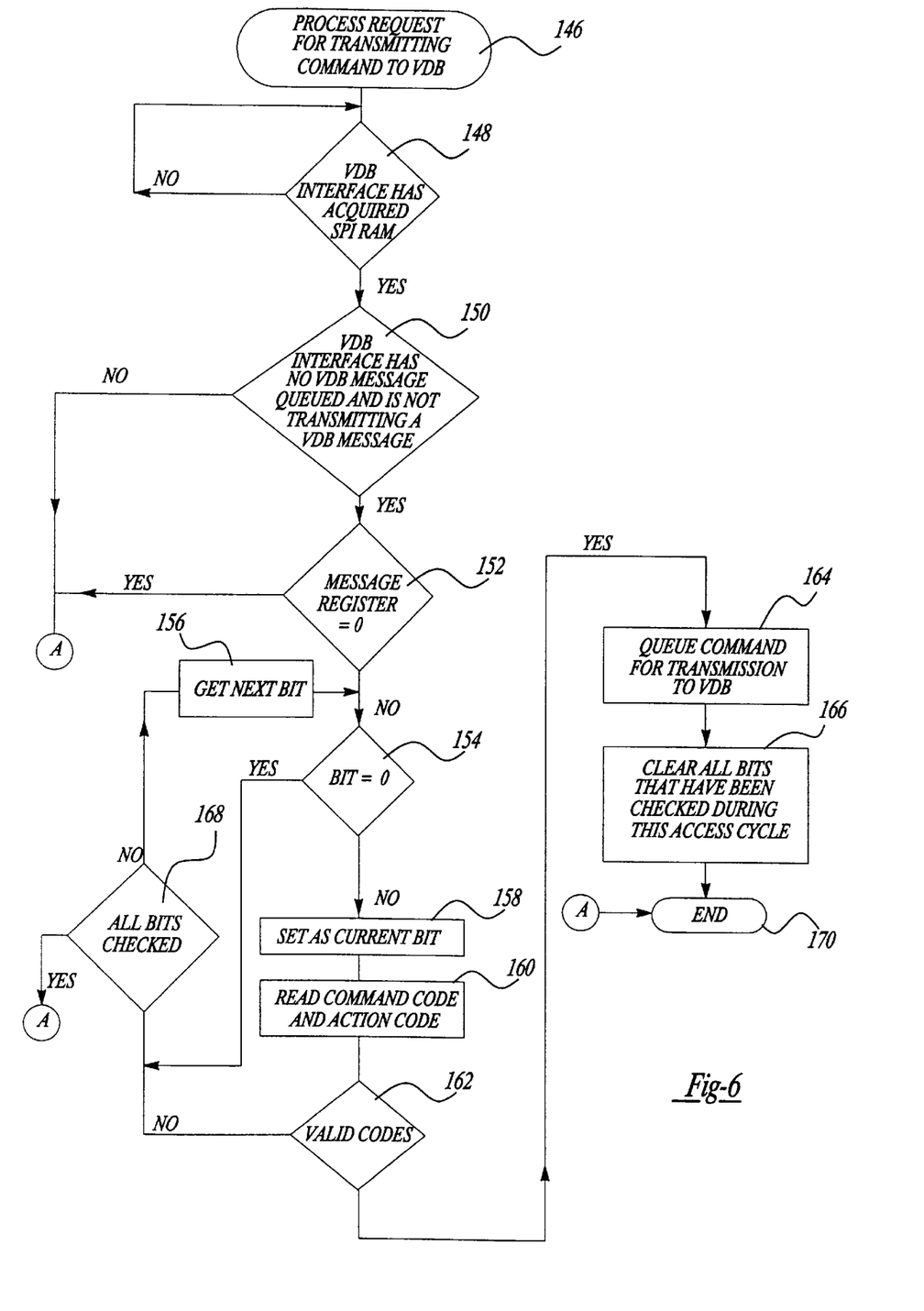
FIG. 6 is flow diagram of the method for processing commands for transmission on the vehicle data bus.

With reference to FIG. 6, a block diagram for processing commands stored in SPI RAM 64 is shown. Control begins at block 146. When VDB 62 successfully acquires access to SPI RAM 64, as shown at block 148, and is neither transmitting a VDB message nor has a message queued for transmission to VDB 48, as shown at block 150, VDB interface 62 checks message register 140 for a non-zero value, as shown at block 152. If message register 140 is non-zero, ITS data bus interface 58 has requested to have a command transmitted on VDB 48. VDB interface 62 treats message register 140 as a circular buffer, and VDB interface 62 returns to the first bit of message register 140 after processing the last bit. When first initialized, VDB interface 62 sets the first message register bit as the current register bit. Thus, VDB interface 62 inspects the first bit the first time throughout the procedure and cycles circularly through message register 140 thereafter.

If the message register 140 is non-zero, VDB interface 62 processes the current message register bit and examines each bit in successive order until a non-zero message register bit is found, as shown at block 154, 168, and 156. VDB interface 62 sets the non-zero bit as the current message register bit, as shown at block 158, and reads the command code and action code corresponding to the current message register bit, as shown at block 160. At block 162, VDB interface 62 then validates the command code and action code. If invalid, VDB interface 62 ignores the command request and returns control to block 168 to determine if all bits have been checked. If all bits have not been checked and additional non-zero bits exist, VDB interface 62 starts at the current message register bit and again examines each bit in order until the next non-zero message register bit is found.

As discussed above, VDB interface 62 sets a non-zero bit as the current message register bit and reads the command code and action code corresponding to the current message register bit. VDB interface 62 continues in this manner until either (1) it finds a non-zero message register bit which corresponds to a valid command code and a valid action code, block 164, or (2) it finds that all non-zero message register bits correspond to a invalid command code or an invalid action code, as shown at block 168.

If a non-zero message register bit and corresponding valid command requests are found, control passes to block 164 where VDB interface 62 prepares the appropriate VDB message for transmission. When the VDB message has been queued for transmission, control passes to block 166 and VDB interface 62 clears all non-zero message register bits that have been checked during this memory access cycle. Control ends at block 170. The clearing of a message register bit by VDB interface 62 implies that either (1) a non-zero message register bit was found to correspond to an invalid command request (2) or that a non-zero message register bit and corresponding valid command request has resulted in the queuing of a message for transmission on VDB 48. The clearing of a message bit does not imply that a message has been successfully transmitted onto VDB 48.

In a preferred mode of the invention, VDB interface 62 utilizes two criteria to determine when to attempt to transmit a message onto VDB 48. First, VDB interface 62 will only attempt to initiate a transmission onto VDB 48 after 40 milliseconds have past since VDB interface 62 last successfully initiated a VDB transmission. Second, VDB interface 62 will wait until VDB 48 is idle before attempting to transmit a message onto VDB 48. Note that VDB interface 62 may need to arbitrate for control of VDB 48 when attempting a transmission.

In a preferred configuration, the memory register comprises a 16 bit register which is further comprised of two eight bit bytes. Each bit of the message register corresponds to a specific command, and predetermined message addresses store the specific instructions for the command. For example, Command bit 1 of message register 140, the most significant bit, may correspond to a request for a door lock command. The actual command may be stored in the address location defined by the address MSG_REG offset by two bytes for the command code and three bytes for the action code to form a 16 bit command. Similarly, Command bit 2, the second most significant bit, of message register 140 may correspond to a request for a chime command. The actual chime command may be stored in a predetermined location such as the address of MSG_REG offset by four bytes for the command code and five bytes for the action code.

Each byte of data available to ITS data bus interface 58 is assigned to a fixed address and a page. Preferably, VDB interface 62 maintains an internal copy of all data in SPI RAM 64 as an SPI RAM shadow. Whenever a byte of data is received from VDB 48 that VDB interface 62 may write to SPI RAM 64, VDB interface 62 updates its SPI RAM shadow. VDB interface 62 updates SPI RAM 64 with the contents of the SPI RAM shadow map at a rate of preferably 1 kilohertz. Preferably, ITS data bus interface 68 does not attempt to read SPI RAM 64 more frequently than this 1 kilohertz rate.

In a further preferred mode of operation, to prevent VDB interface 62 from monopolizing SPI RAM 64, VDB interface 62 performs the following tasks during each SPI RAM 64 acquisition cycle:

1. VDB interface 62 updates SPI RAM 64;
2. If VDB interface 62 has no message queued for and transmitting to VDB 48 and if the message register is non-zero, VDB interface 62 inspects the message register for the next message register bit which is set. If VDB interface 62 has a message queued or is transmitting to VDB 48, or if message register is zero, control proceeds to step 5.
3. If VDB interface 62 determines that a message register bit has been set and has not been checked during the current memory access cycle, VDB interface 62 inspects the corresponding command request to determine if it is valid. If VDB interface 62 finds no message register bit which is both set and has not been checked during the memory access cycle, control proceeds to step 5.
4. If the command request is valid, VDB interface 62 prepares the appropriate VDB message for transmission. If the command is invalid, returns to step 3.
5. VDB interface 62 clears any message register bits which were set and which were checked during any current access cycle.

In view of the foregoing, one can see that the present invention provides many advantages for data exchange between vehicle data buses and consumer product data buses. In particular, the present invention provides improved flexibility in what consumer products can be interfaced with a vehicle and enables a number of module manufacturers the capability of making components which may interface to the vehicle by simply including a device which may communicate on an ITS data bus or includes an ITS data bus interface. Further, the present invention enables any of a number of ITS data buses, such as D$^2$B, USB, IDB, Firewall, and the like, with no additional circuitry and requires only a single validation process for any of these buses. Further, the present invention creates an interface to any vehicle data bus with only one gateway bus required. Further yet, manufactures of consumer produces are relieved from manufacturing devices adaptable to any of a number of vehicle data bus structures, protocols, message strategies, and the like. Further, the present invention acts as a firewall between two data buses, thereby insuring vehicle data bus security and eliminating the need to disclose the vehicle data bus message handling software to suppliers.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention and described in the following claims.

What is claimed is:

1. A data sharing system in a vehicle, comprising:
   a vehicle system controller operable to process vehicle data to control at least one vehicle related function, the vehicle system controller having at least intermittent and direct access to and exchanging data on a vehicle data bus;
   an ancillary system controller to control an operation other than the one vehicle related function, the ancillary system controller being restricted from the vehicle data bus and thereby being dependent upon data exchange with the vehicle system controller for input data and on the vehicle system controller to implement a selected control operation;
   memory accessible by the vehicle system controller and the ancillary system controller;
   a vehicle data bus interface for exchanging data between the vehicle system controller and the memory; and
   an ancillary data bus interface for exchanging data between the vehicle system controller and the memory, wherein the vehicle data bus interface restricts access of the ancillary system controller from the vehicle data bus.

2. The apparatus of claim 1 further comprising an ancillary data bus for providing data to a plurality of ancillary control devices, the ancillary data bus interface interconnecting the memory and the ancillary data bus.

3. The apparatus of claim 1 further comprising a serial peripheral interface bus interconnecting the vehicle data bus interface, the memory, and the ancillary data bus interface.

4. The apparatus of claim 3 wherein the vehicle data bus interface and the ancillary data bus interface selectively read and write to the memory via the serial peripheral bus, and the vehicle data bus interface and the ancillary data bus interface electronically communicate to arbitrate access to the memory.

5. The apparatus of claim 4 wherein vehicle data bus interface and the ancillary device bus interface selectively act as master devices to the memory.

6. The apparatus of claim 1 wherein the memory further comprises a plurality of data storage location, each command storage location storing data corresponding to a predetermined vehicle parameter.

7. The apparatus of claim 6 wherein the vehicle data bus interface stores the predetermined vehicle parameter in the selected command storage location, and the ancillary data bus interface reads the predetermined vehicle parameter from the selected command storage location.

8. The apparatus of claim 6 wherein the memory further comprises a plurality of command storage locations, each command storage location storing data corresponding to a predetermined vehicle command.

9. The apparatus of claim 8 wherein the vehicle data bus interface stores the predetermined vehicle command in the selected command storage location, and the ancillary data bus interface reads the predetermined vehicle command from the selected command storage location.

10. A method of forming a data gateway in a vehicle, comprising the steps of:

providing a vehicle data bus (VDB) and a VDB controller for transferring data between the vehicle data bus and the VDB controller;

providing an intelligent vehicle transportation system data bus (ITSDB) and an ITSDB controller for transferring data between the ITS data bus and the ITSDB controller;

providing a common memory to transfer data between the respective busses, each of the controllers being operable to exchange data with the common memory;

exchanging data between the respective controllers and the common memory, wherein one of the controllers reads data written to common memory by the other controller, and one controller writes data to common memory that read by the other controller;

arbitrating access for each of said controllers to the common memory, said step of arbitrating including determining if one of the respective controllers has captured the common memory and is exchanging data with the common memory; and prohibiting one controller from exchanging data with the common memory while the other controller maintains capture of the common memory.

11. The method of claim 10 further comprising providing a common data bus for interconnecting the VDB controller, the ITSDB controller, and the common memory, wherein the step of arbitrating access to each of said controller further comprises exchanging handshake signals between the respective controllers to arbitrate access to the common bus.

12. The method of claim 11 wherein the step of exchanging data between the controllers and common memory further comprises serially loading data into and out of common memory.

13. The method of claim 12 further comprising the step of exchanging data between the respective controllers and the common memory further comprises exchanging command information so that command received on the data bus for one controller may be placed into common memory and read by the other controller and placed on the data bus for the other controller.

14. The method of claim 10 wherein the step of exchanging data between the controllers and common memory further comprises serially loading data into and out of common memory.

15. The method of claim 10 further comprising the step of exchanging data between the respective controllers and the common memory further comprises exchanging command information so that command received on the data bus for one controller may be placed into common memory and read by the other controller and placed on the data bus for the other controller.

* * * * *